(12) United States Patent
Chen et al.

(10) Patent No.: US 7,027,772 B2
(45) Date of Patent: Apr. 11, 2006

(54) INTER-VEHICLE MESSAGE DISSEMINATING METHOD AND APPARATUS FOR THE APPLICATION OF THE METHOD

(75) Inventors: Kuo-Rong Chen, Panchiao (TW); Chun-Chung Lee, Taipei (TW); Cheng-Hung Huang, Miaoli (TW)

(73) Assignee: Sin Etke Technology Co., Ltd., Taipei (TW)

( * ) Notice: Subject to any disclaimer, the term of this patent is extended or adjusted under 35 U.S.C. 154(b) by 487 days.

(21) Appl. No.: 10/351,329

(22) Filed: Jan. 27, 2003

(65) Prior Publication Data

US 2004/0082350 A1    Apr. 29, 2004

(30) Foreign Application Priority Data

Oct. 28, 2002    (TW) ............................... 91132007 A

(51) Int. Cl.
*H04B 5/00* (2006.01)

(52) U.S. Cl. ................ 455/41.1; 455/404.1; 455/456.1

(58) Field of Classification Search ............... 455/41.2, 455/96, 99, 569.2, 569.1, 90.2, 90.1, 41.1, 455/41.3, 426.1, 404.1, 517
See application file for complete search history.

(56) References Cited

U.S. PATENT DOCUMENTS

| | | | |
|---|---|---|---|
| 6,418,299 B1* | 7/2002 | Ramanathan | 455/7 |
| 6,429,773 B1* | 8/2002 | Schuyler | 340/425.5 |
| 6,647,270 B1* | 11/2003 | Himmelstein | 455/456.1 |
| 6,697,638 B1* | 2/2004 | Larsson et al. | 455/553.1 |
| 6,707,378 B1* | 3/2004 | MacNeille et al. | 340/435 |
| 2002/0177411 A1* | 11/2002 | Yajima et al. | 455/41 |
| 2004/0048569 A1* | 3/2004 | Kawamura | 455/41.1 |
| 2004/0203379 A1* | 10/2004 | Witkowski et al. | 455/41.2 |
| 2005/0130656 A1* | 6/2005 | Chen | 455/436 |

* cited by examiner

*Primary Examiner*—Tilahun Gesesse
(74) *Attorney, Agent, or Firm*—Bacon & Thomas, PLLC

(57) ABSTRACT

An inter-vehicle message disseminating method in which every vehicle carries a blue-tooth device (or 802.11 device) to actively login to or to passively accept a login from the respective blue-tooth device (or 802.11 devices) of other vehicles with a common authorization key to make a wireless connection for mutual transmitting message. When a message provided to one first vehicle, the first vehicle transmits the message to a number of second vehicles through the respective blue-tooth device, and then the second vehicles again transmit the message with their respective blue-tooth devices to another third vehicles. To transmit the message generation to generation repeatedly within these vehicles, forming a virus infectious frame to wirelessly disseminate kinds of message of update, advertising/promoting, searching, rescuing, socializing information to everywhere without geographic limitations.

30 Claims, 6 Drawing Sheets

| M | Serious_No | | Dissemi_Content | |
|---|---|---|---|---|
| ... | ............ | .......... | .......... | ......... |
| M1 = | %SN(2002100800168) | C=[AR(update) | /TYP(cefiro) /AID(video) | /Data=sw(#!*&%&_%&*.........)]% |
| M2 = | %SN(2002100800169) | C=[AR(update) | /TYP(sentra) /AID(navi) | /Data=em(*^$J#H!^$.!*&#............)]% |
| ... | ............ | .......... | .......... | ......... |
| M3 = | %SN(2002100800170) | C=[AR(advert5) | /TYP(all) /AID(audio) | /Data=ad(H^#$K&*@#F%.........)]% |
| M4 = | %SN(2002100800171) | C=[AR(advert2) | /TYP(serena) /AID(a/video) | /Data=ad(*$H#F%*!^#$..............)]% |
| ... | ............ | .......... | .......... | ......... |
| M5 = | %SN(2002100800172) | C=[AR(search1) | /VID(2A5995, 2A9431, 5B6925,.............)]% | |
| M6 = | %SN(2002100800173) | C=[AR(search2) | /VID(2A5995, AB7254, FD6528, BG4495,..........)]% | |
| ... | ............ | .......... | .......... | ......... |
| M7 = | %RS(010017)7K6543 | C=[AR(rescue1) | /VID(7K6543) /GPS($X_2,Y_2,Z_2$) | /Data=rm(I am abducted, please call police!)]% |
| M8 = | %RS(010018)7K6543 | C=[AR(rescue2) | /VID(7K6543) /GPS($X_3,Y_3,Z_3$) | /Data=rm(I run out my gasoline, help me!)]% |
| ... | ............ | .......... | .......... | ......... |
| M9 = | %MF(010019)7K6543 | C=[AR(match) | /VID(7K6543) /GPS($X_4,Y_4,Z_4$) | /Data=ml(sex/male+age/25-45+hobby/pop songs,....)]% |
| ... | ............ | .......... | .......... | ......... |

[VID]=2A5995

[TYP]=cefiro

[AD#]=(1,3,4,5,8)+[TYP]

[Search_1]=alarm+hpbl+bl(I am a stolen vehicle, please call police!)+ GPS($X_0,Y_0,Z_0$)

[Search_2]=pl+bl(I am 2A5995, I am here($X_1,Y_1,Z_1$)!)

[TO_1]=1 hour +Zone(New York City)

[TO_2]=10 minutes + radius(500m)

[RM_1]=bl(I am abducted, please call police!)

[RM_2]=bl(I run out my gasoline, help me!)

[Basic]=name(Michael Jackson)+ sex(male)+age(40)+hobby(pop song, tennis,...)

[ML]=sex(female)+age(25-45)+hobby(pop song, tennis,...)

[TD_1]=3 days

[TD_2]=radius(500m)

..........................

%SN(2002100800167)+C=[AR(update)/TYP(all)/AID(navi)/Data=sw(*#^$%!&%&*#$%&%^*&%..........................)] %

%RS(010017)7K6543+C=[AR(rescue1)/VID(7K6543)/GPS($X_2,Y_2,Z_2$)/Data=rm(I am abducted, please call police!)]%

%MF(010019)7K6543+C=[AR(match)/VID(7K6543)/GPS($X_4,Y_4,Z_4$)/Data=ml(sex/male+age/25-45+hobby/pop songs,...)]%

[VID]=7K6543

[TYP]=sentra

[AD#]=(2,3,6,7)+[TYP]

[Search_1]=alarm+hpbl+bl(I am a stolen vehicle, please call police!)+ GPS($X_0,Y_0,Z_0$)

[Search_2]=pl+bl(I am 7K6543, I am here($X_1,Y_1,Z_1$)!)

[TO_1]=1 hour +Zone(New York City)

[TO_2]=10 minutes + radius(500m)

[RM_1]=bl(I am abducted, please call police!)

[RM_2]=bl(I run out my gasoline, help me!)

[Basic]=name(Madonna)+sex(female)+age(44)+hobby(pop song, swimming,...)

[ML]=sex(male)+age(25-45)+hobby(pop song, swimming,...)

[TD_1]=3 days

[TD_2]=radius(500m)

%SN(2002100800168)+C=[AR(update)/TYP(cefiro)/AID(video)/Data=sw(#!*&%&_%&*^*#$^&@#..................................)] %

%RS(000917)RH5913+C=[AR(rescue1)/VID(RH5913)/GPS(......)/Data=rm(.................................................)]%

%MF(956119)GD4396+C=[AR(match)/VID(GD4396)/GPS(......)/Data=ml(........................................)]%

FIG. 6

INTER-VEHICLE MESSAGE DISSEMINATING METHOD AND APPARATUS FOR THE APPLICATION OF THE METHOD

BACKGROUND OF THE INVENTION

1. Field of the Invention

The present invention relates to an inter-vehicle message disseminating method and, more particularly, to such an inter-vehicle message disseminating method that enables vehicles carrying a wireless communication apparatus to wirelessly disseminate information to a number of other vehicles by means of a virus infectious frame. The invention relates also to an on-vehicle wireless communication apparatus for the application of the method.

2. Description of Related Art

In early days, radio is used in vehicles for wireless communication. Currently, on-vehicle mobile telephones having a GSM module or GPRS module are commonly used in vehicles for transmitting voice or data wirelessly. However, early radio apparatus cannot effectively keep secret. Recently developed GSM modules or GPRS modules, or the coming 3G modules pertain to long distance communication architecture. A telecommunication service provider must build a big number of base stations within a big area to establish a wireless communication network. The installation cost of such a wireless communication network is high. The time to establish such a wireless communication network is long. Further, the geographic limitation of conventional telecommunication is restricted within the area having base stations installed therein.

Further, the communication tariff of the aforesaid long distance communication architecture is high. It is not reasonable to request consumers to pay such a high tariff for a short distance communication. The aforesaid limitations cause consumers not willing to use the expensive system, limit other commercial applications, and hinder other non-commercial developments.

Therefore, it is desirable to have an inter-vehicle message disseminating method and apparatus for the application of the method that eliminates the aforesaid problems.

SUMMARY OF THE INVENTION

It is the main object of the present invention to provide an inter-vehicle message disseminating method and apparatus for the application of the method, which uses wireless communication apparatus on multiple vehicles to form a virus infectious frame, so as to form a wireless communication platform among the vehicles and to take advantage of the high movability of the vehicles for disseminating information wirelessly without geographic limitations. It is another object of the present invention to provide an inter-vehicle message disseminating method and apparatus for the application of the method, which provides a low installation cost wireless communication platform of low tariff for commercial as well as non-commercial applications.

To achieve these and other objects of the present invention, the inter-vehicle message disseminating method is to install a specific wireless communication apparatus, for example, a blue-tooth device or 802.11 device on each of a number of vehicles. The specific wireless communication apparatus of the vehicles all have a common characteristic, i.e., they all use a common authorization key to wirelessly login to each other for making a wireless connection for mutual transmitting voice and/or data. When an information provided to one first vehicle, the first vehicle transmits the information to a number of second vehicles through the respective specific wireless communication apparatus wirelessly connected, and then the second vehicles again transmit the information through the respective specific wireless communication apparatus to another third vehicles. To transmit the information generation to generation repeatedly within these vehicles, forming a virus infectious frame. Therefore, a wireless communication platform is established among these vehicles. Due to the high movability of the vehicles, every kind of information, for example, update information, advertising/promoting information, searching information, rescuing information, socializing information, or any of a variety of other information fields can be spread and disseminated to the vehicles beyond a long distance without geographic limitations. Because the invention eliminates the necessity of building a big number of base stations, a low installation cost wireless communication platform of low tariff can be established among vehicles for commercial as well as non-commercial applications.

The specific wireless communication apparatus on each vehicle comprises a blue-tooth module, or 802.11 module, or any other equivalent wireless communication module for wirelessly receiving an external disseminating information, and a processor for controlling the specific wireless communication module to wirelessly transmit the disseminating information to the respective specific wireless communication module of other vehicles wirelessly connected thereto.

The processor further can control at least one electronic vehicle component to operate subject to the content of the disseminating information.

Other objects, advantages, and novel features of the invention will become more apparent from the following detailed description when taken in conjunction with the accompanying drawings.

BRIEF DESCRIPTION OF THE DRAWINGS

FIG. 4 illustrates the content of disseminating information according to the preferred embodiment of the present invention.

FIG. 5 illustrates the content stored in the memory device of one vehicle according to the preferred embodiment of the present invention.

FIG. 6 illustrates the content stored in the memory device of another vehicle according to the preferred embodiment of the present invention.

DETAILED DESCRIPTION OF THE PREFERRED EMBODIMENT

Figure 1:
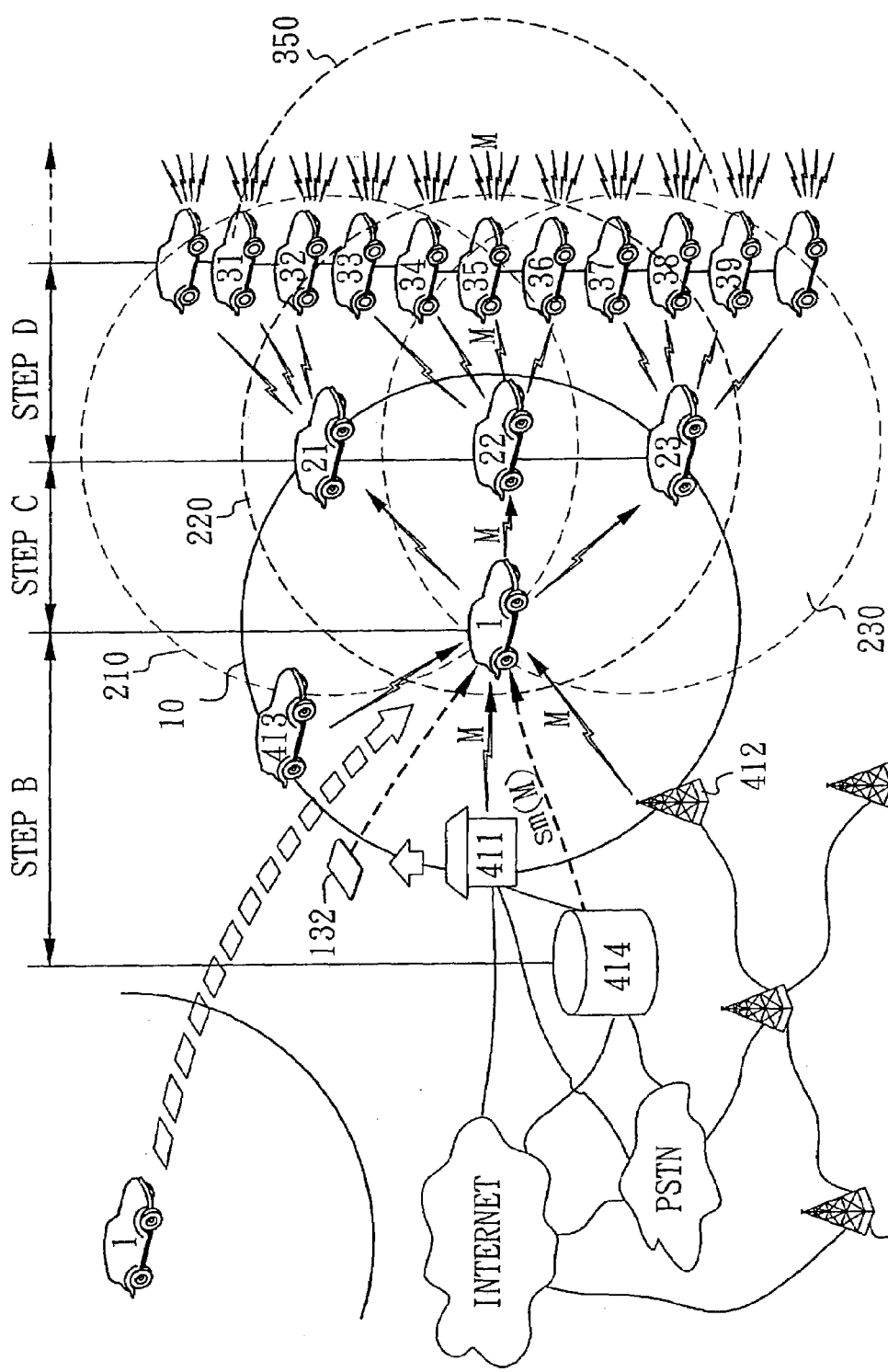
FIG. 1 is a schematic drawing showing the virus infectious frame of a preferred embodiment of the present invention.
Figure 2:
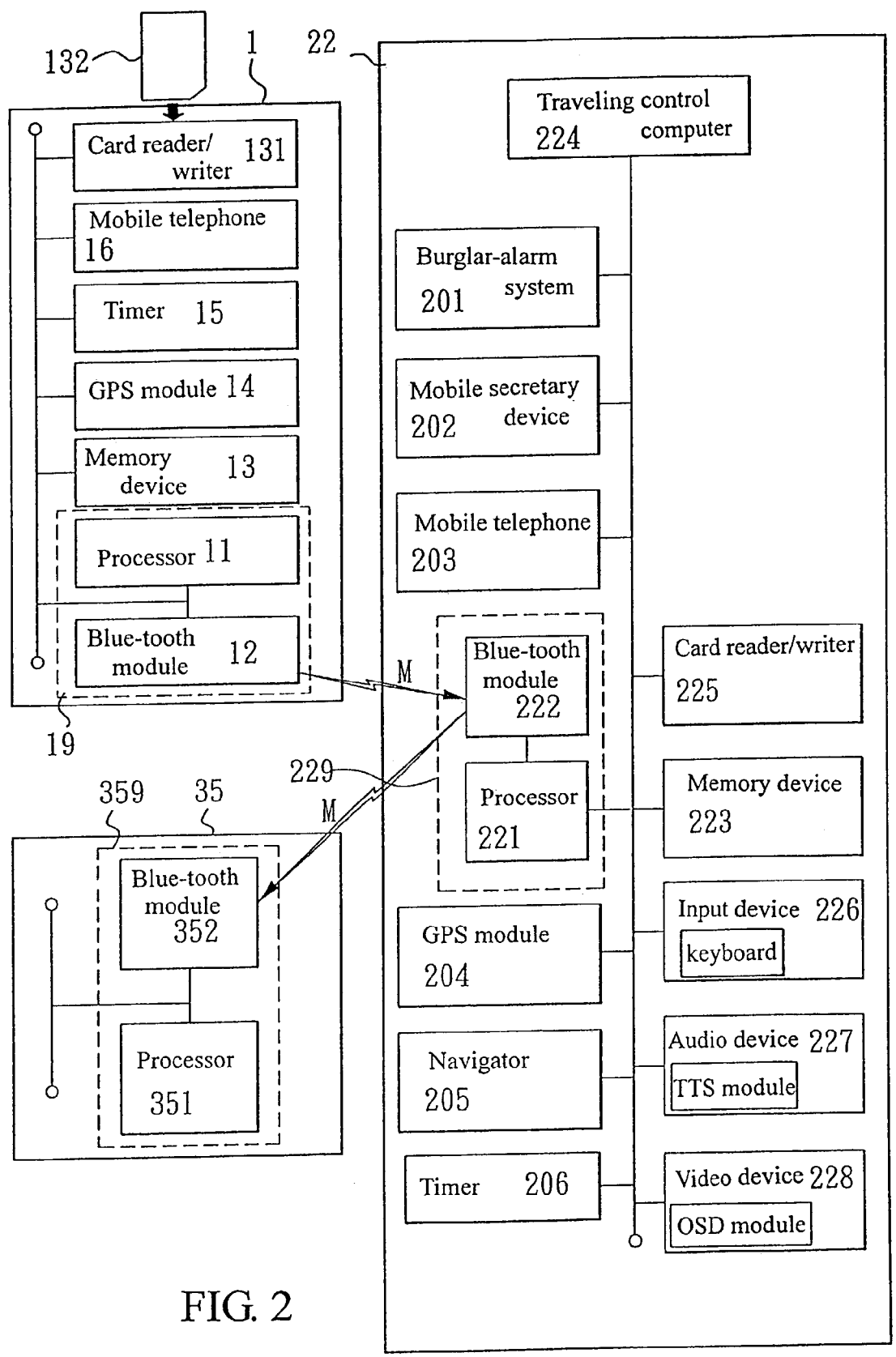
FIG. 2 is a system block of the preferred embodiment of the present invention.

Referring to FIG. 1, the invention is applied to multiple vehicles 1, 21, 22, 23, . . . 31, 32, 33, 34, 35, 36, 37, 38, 39 . . . and etc., each vehicle carrying a specific wireless communication apparatus. The specific wireless communication apparatus can be a blue-tooth device, or 802.11 device, or any of a variety of short-distance wireless communication apparatus is preferable. According to the present preferred embodiment as shown in FIG. 2, each vehicle 1, 22, 35 . . . and etc. carries a blue-tooth device 19, 229, 359 . . . and etc.. The so-called "carrying" means to fixedly install the hardware of the blue-tooth device in the vehicle and permanently connected to the electric system of the vehicle. Alternatively, the blue-tooth device can be installed in a mobile telephone or PDA (personal digital assistant), so that the user can carry the mobile telephone or PDA into the vehicle and then connected to the electric system of the vehicle.

With reference to FIG. 2, the flue-tooth device 19 of the vehicle 1 is comprised of a processor 11 and a blue-tooth module 12. The vehicle 1 further has installed therein a memory device 13, a GPS (global positioning system) module 14, a timer 15, and a mobile telephone 16. The memory device 13 can be a regular memory, or the combination of a card reader/writer 131 and an IC memory card 132.

FIG. 2 also shows that the blue-tooth device 229 of another vehicle 22 comprised of a processor 221 and a blue-tooth module 222. The vehicle 22 further has installed therein a memory device 223, and a variety of electronic vehicle components such as burglar-alarm system 201, mobile secretary device 202, mobile telephone 203, GPS (global positioning system) module 204, navigator 205, timer 206, traveling control computer 224, card reader/writer 225, input device 226, audio device 227, video device 228, . . . and etc.

Figure 3:
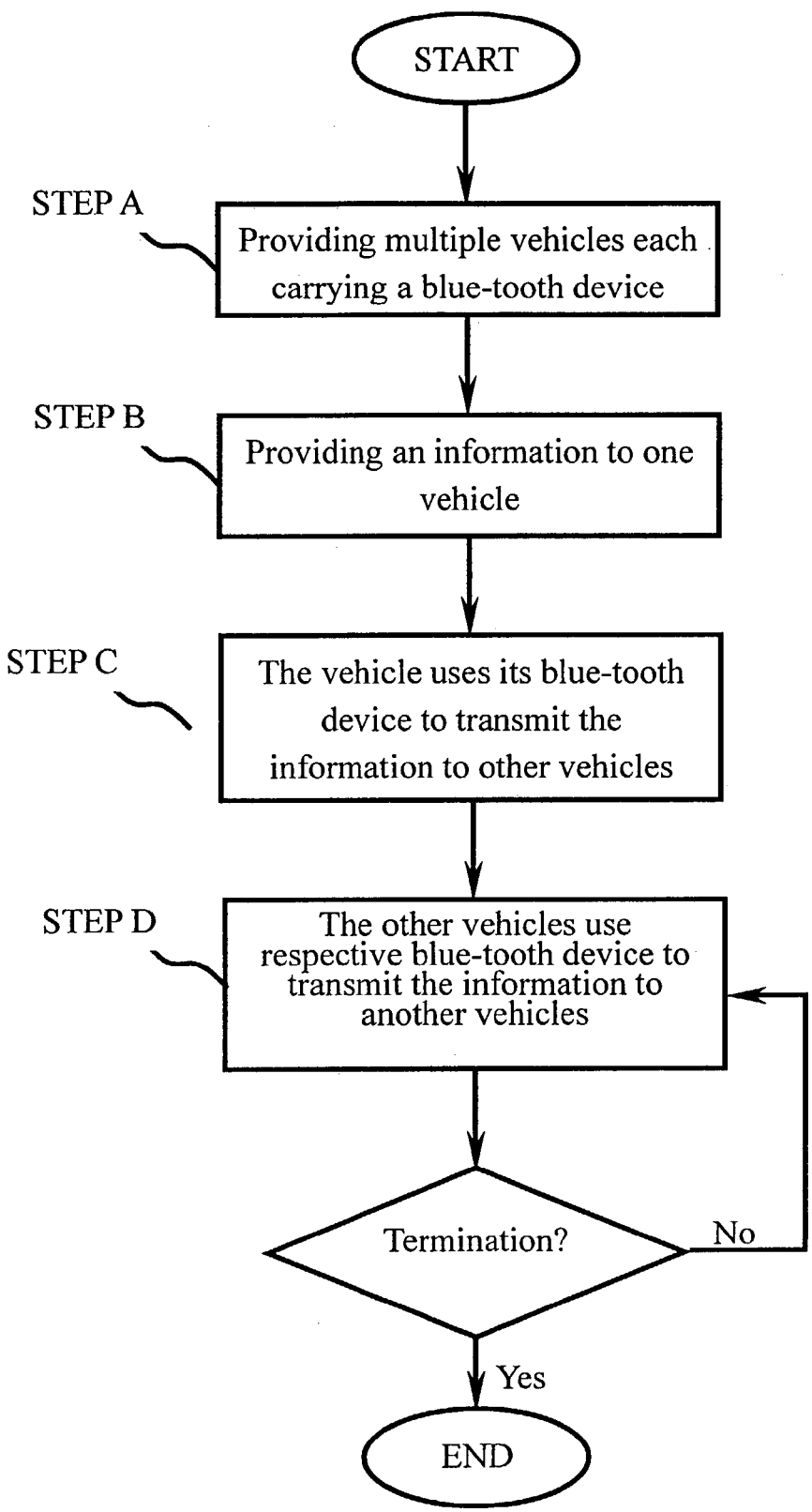
FIG. 3 is an operational flow chart of the preferred embodiment of the present invention.

Referring to FIG. 3 and FIGS. 1 and 2 again, the invention disseminates information subject to the following steps:

(Step A) To provide multiple vehicles as stated above each carries a blue-tooth device having a blue-tooth module of which the communication radius reaches to a predetermined distance, for example, 100 meters, outside the respective vehicle. The blue-tooth modules of the blue-tooth devices of the vehicles all use a common authorization key for mutual authorization. Therefore, as shown in FIG. 1, the blue-tooth module 12 in the vehicle 1 can be itself a master device to actively log into maximum seven slave devices, for example, the blue-tooth modules 222 of the vehicle 22, within the effective communication radius of the blue-tooth module 12 by means of the common authorization key, so as to make a wireless connection when the authorization key approved mutually and to form a piconet 10 based on the blue-tooth module 12 of the vehicle 1 at the center when wirelessly connected. The blue-tooth module 12 of the vehicle 1 can also be itself a slave device to passively accept log-in requests from the blue-tooth modules of surrounding vehicles 21, 413, . . . etc. with the same common authorization key, so as to make a wireless connection when the authorization key approved mutually.

Because every vehicle can organize a piconet itself and can patrol everywhere independently, every piconet is highly movable. As illustrated in FIG. 1, the upper left vehicle 1 is coming from a remote side and approaching vehicles 21, 22, 23. Therefore, piconets are dynamically moving relative to one another and dynamically overlapped.

For easy understanding of the present invention, vehicles 1, 22 and 35 are selected as examples and described in detail. The three blue-tooth modules 12, 222 and 352 form the three piconets 10, 220 and 350 shown in FIG. 1 that are overlapped on one another.

(Step B) Referring to FIGS. 1 and 2, when the vehicle 1 returned to a vehicle repair shop 411 for maintenance, a blue-tooth device (not shown) fixedly located at the vehicle repair shop 411 sends a disseminating information M to the blue-tooth device 19 of the vehicle 1. The disseminating information M can be a voice, data, or the combination type of voice and data.

(Step C) When the vehicle 1 returned to the public road, the blue-tooth module 12 of device 19 in vehicle 1 wirelessly transmits the disseminating information M to the blue-tooth modules of other vehicles 21, 22, 23 . . . within the piconet 10 which are wirelessly connected to the blue-tooth module 12.

(Step D) The vehicles 21, 22, 23 . . . wirelessly transmit the disseminating information M again to another vehicles 31, 32, 33, 34, 35, 36, 37, 38, 39 . . . and etc. within the respective piconets 210, 220, 230 through the respective blue-tooth devices. This disseminating information M is transmitted generation to generation repeatedly, thereby forming a virus infectious frame, and therefore a wireless communicating platform is established among the vehicles. Because the vehicles are highly movable and run independently, the disseminating information M can be carried to everywhere and actively disseminated in remote areas, especially the mountain area, without base station. Therefore, the invention achieves wireless remote information dissemination, which is free from geographic limitations.

The blue-tooth modules used in the present invention are preferably higher than class II so that the communication radius can reach to the distance of 100 meters outside the vehicle.

Referring to FIG. 1 again, the disseminating information M can be wiredly sent by a remote control center 414 in advance to vehicle repair shops 411, exhibition centers, or contracted shops at different locations through a exclusive network, PSTN (public switched telephone network), or the Internet, for enabling the blue-tooth devices or 802.11 apparatus of the respective vehicle repair shops 411, exhibition centers or contracted shops to disseminate the information to surrounding vehicle 1. The disseminating information M can also be sent to surrounding vehicle 1 through either of the following ways:

(1) The remote control center 414 wirelessly sends the disseminating information M to surrounding vehicle 1 by means of a short message;

(2) The remote control center 414 dispatches vehicle 413 carrying the disseminating information M to the public road, enabling the blue-tooth device of the vehicle 413 to wirelessly disseminate the disseminating information M to surrounding vehicle 1;

(3) The remote control center 414 issues IC memory cards 132 having the disseminating information M therein, and the owner of the vehicle 1 can go to the vehicle repair shop 411 or the like to replace one IC memory card 132 having the disseminating information M. Alternatively, the vehicle owner can download the new issues from the web site of the remote control center 414 to update the content of the IC memory card, and then insert the updated IC memory card 132 into the card reader/writer 131 for reading;

(4) The technician of the vehicle repair shop 411 can directly load the disseminating information M into the memory device 13 when the vehicle 1 returned to repair shop 411 for maintenance; or (5) Install blue-tooth transmission stations 412 in different locations to enhance the information disseminating capacity.

As described above, the invention can disseminate any of a variety of information to remote places beyond the effective ranges of base stations "wirelessly" and "free from geographic limitations". Further, because the transmission of information with blue-tooth devices is free of charge, consumers are pleased to use, and telecommunication providers can save much base station installation cost. In general, the invention provides a low-cost low-tariff inter-vehicle wireless communicating platform.

The invention provides different applications as described hereinafter with reference to the dissemination contents shown in FIG. 4, in which each disseminating information M is comprised of a series number SN and a content C.

Update Information

With reference to FIG. 4, the update information M1 contains an updating attribute [AR]=update, and update content C including vehicle-type [TYP]=cefiro, apparatus-identification [AID]=video, and updating data type and content in [Data] field.

With reference to FIGS. 1 and 2, the aforesaid update information M1 is prepared by the vehicle company, and wiredly transmitted in advance to every vehicle repair shop 411, exhibition center and contracted shop through the Internet. When the vehicle 1 returned to one vehicle repair shop 411, the blue-tooth device (not shown) of the vehicle repair shop 411 wirelessly transmits the update information M1 to the blue-tooth module 12 of the vehicle 1 automatically, enabling the update information M1 to be stored in the memory device 13 of the vehicle 1.

When the vehicle 1 left the vehicle repair shop 411 and returned to the public road, the processor 11 of the vehicle 1 controls the blue-tooth module 12 to wirelessly transmit the update information M1 to the blue-tooth modules of vehicles 21, 22, 23 . . . within the corresponding piconet 10 which are wirelessly connected to the blue-tooth module 12, enabling the blue-tooth devices of the vehicles 21, 22, 23 . . . to disseminate the update information M1 again to another vehicles 31, 32, 33, 34, 35, 36, 37, 38, 39 . . . within the respective piconets 210, 220, 230. Thus, repeated again and again, the update information M1 is quickly disseminated to remote vehicles. Therefore, the vehicle company can rapidly send the updated version to the clients without requesting the clients to go back to the distribution points for data updating.

According to this example, the vehicle 22 has a memory device 223 installed therein. FIG. 5 illustrates the storage content of the memory device 223. The content of the memory device 223 includes series number SN and disseminating content C of the previous information been received, and the basic identification data of the vehicle 22 such as vehicle-identification [VID], vehicle-type [TYP], basic-data-of-vehicle-owner [Basic], advertising-limitations [AD], operations-when-searched [Search], conditions-of-terminating-operation [TO], conditions-of-terminating-dissemination [TD], and matching-limitation [ML].

Therefore, when the blue-tooth module 222 of the vehicle 22 received the update information M1, the processor 221 compares the series number SN of the currently received update information M1 to the series number SN of the previous information stored in the memory device 223. If the series number SN of the currently received update information M1 is not a new one, the processor 221 only disseminates the currently received update information M1 without storing it into the memory device 223. Preferably, the processor 221 can retrieve the newer series number SN and disseminating content C of the previous information stored in the memory device 223, and then controls the blue-tooth module 22 to disseminate the retrieved information.

FIG. 4 shows that the series number SN=2002100800168 of the currently received update information M1 is newer than the series number SN=2002100800167 of the previous information stored in the memory device 223 shown in FIG. 5. Therefore, the processor 221 controls the blue-tooth module 22 to transmit and disseminate the currently received update information M1, and simultaneously to replace the content of the memory device 223 with the currently received update information M1. At this time, the processor 221 keeps on comparing the vehicle-type [TYP]=cefiro of the currently received update information M1 to be matched with the vehicle-type [TYP]=cefiro stored in the memory device 223 shown in FIG. 5. Therefore, the processor 221 updates the software program of the apparatus-identification [AID]=video device 228 with the updating content in [Data] field.

According to this application example, it can update any kind of software program of electronic vehicle component such as traveling control computer 224, card reader/writer 225, input device 226 (including keyboard), audio device 227 (including TTS module), video device 228 (including OSD module), burglar-alarm system 201, mobile secretary device 202, mobile telephone 203, GPS (global positioning system) module 204, a navigator 205, and the like.

The update information M2 shown in FIG. 4 also contains an updating attribute [AR]=update, whose series number SN=2002100800169 is newer than the series number SN=2002100800168 of the content stored in the memory device 223. Thus, the processor 221 stores the currently received update information M2 in the memory device 223 to replace the previous information M1, and disseminates this update information M2 wirelessly. Further, the processor 221 compares the vehicle-type [TYP]=sentra of this update information M2 not in match with the vehicle-type [TYP]=cefiro stored in the memory device 223 of the vehicle 22 shown in FIG. 5. Therefore, the processor 221 does not update the electronic map of the apparatus-identification [AID]=navigator 205 with the updating content in [Data] field.

According to this application example, it can update any kind of data content used in electronic vehicle component, for example, the controlling content of the traveling control computer 224, the introduction content of specific scenic-spot played by the audio device 227/video device 228, the setting parameters of the burglar-alarm system 201, the phone book content of the mobile telephone 203, the electronic map of the navigator 205, the setting parameters of the timer 206, or the like.

Advertising/promoting Information

With reference to FIG. 4, the advertising/promoting information M3 contains an advertising attribute [AR]=advert5, which is provided to the owner of the vehicle 1 by the control center 414 by means of issuing an IC memory card 132. When the vehicle owner inserted the IC memory card 132 into the card reader/writer 131, the processor 1 retrieves the content of the IC memory card 132, and drives the blue-tooth module 12 to transmit and disseminate the advertising/promoting information M3 to other vehicles 21, 22, 23 . . . wirelessly.

When the blue-tooth device 222 of the vehicle 22 received the advertising/promoting information M3, the processor 221 compares the series number SN=2002100800170 of this information M3 to be newer than the series number SN=2002100800169 of the previous information M2 stored in the memory device 223. Thus, the processor 221 stores the currently received advertising/promoting information M3 in the memory device 223 to replace the previous information M2, and also disseminates the currently received advertising/promoting information M3 wirelessly. Thereafter, the processor 221 checks the classification of attribute [AR]=advert5 of the currently received advertising/promoting information M3 is "5" to be in conformity with one of the advertising-limitations [AD] stored in the memory device 223 shown in FIG. 5 and the vehicle-type [TYP]=all in the information M3 to be in conformity with the vehicle-type [TYP]=cefiro of the memory device 223 shown in FIG. 5, and therefore the processor 221 controls the apparatus-identification [AID]=audio device 227 to play the advertising/promoting content in [Data] field.

With reference to FIG. 4 again, the advertising/promoting information M4 also contains an advertising attribute [AR]=advert 2, and the series number SN=2002100800171 of this advertising/promoting information M4 is newer than the series number SN=2002100800170 of the previous information M3 stored in the memory device 223, therefore the processor 221 stores this advertising/promoting information M4 in the memory device 223 to substitute the previous information M3, and then disseminates this advertising/promoting information M4 wirelessly. At this time, the processor 221 compares the classification "2" in advertising attribute [AR]=advert2 of this advertising/promoting-information M4 not in conformity with any one of the advertising-limitations [AD] stored in the memory device 223, or compares the vehicle-type [TYP]=serena of information M4 not in conformity with the vehicle-type [TYP]=cefiro stored in the memory device 223 of the vehicle 22 shown in FIG. 5. Therefore, the processor 221 does not control the audio device 227 and the video device 228 to play the advertising/promoting content in [Data] field.

The aforesaid advertising-limitations [AD] can be defined or changed by the vehicle owner, which includes one of the conditions of: advertising classification, advertising length, time/date, time interval, specific location, geographic zone, their Boolean combination, or any other conditions set by the vehicle owner.

Searching Information

With reference to FIG. 4, the searching information M5 contains an advertising attribute [AR]=search1, which is a stolen vehicle listing containing various license plate numbers of stolen vehicles issued by a police organization given over to the control center 414 through the Internet.

The processor 221 compares the series number SN=2002100800172 of this information M5 to be newer than the series number SN=2002100800171 of the previous information M4 stored in the memory device 223. Thus, the processor 221 stores the currently received searching information M5 in the memory device 223 to substitute the previous information M4, and also disseminates the currently received searching information M5 wirelessly.

Thereafter, the processor 221 compares the vehicle-identification [VID]=2A5995 (i.e. license plate number) of the vehicle 22 stored in the memory device 223 as shown in FIG. 5 to be in conformity with one of the license plate numbers in [VID] field of the stolen vehicle listing of the searching information M5. Thus, the processor 221 actively turns on the alarm of the burglar-alarm system 201 and flashes the HPBL (high position braking lamp) subject to the content of operations-when-searched [Search_1] stored in the memory device 223 as shown in FIG. 5, giving a visual signal and an audio signal to notice surrounding cars. The processor 221 can also drives the blue-tooth module 222 to disseminate the message of "I am a stolen vehicle, please call the police!" with the current position data $(X_0, Y_0, Z_0)$ generated by the GPS module 204. Therefore, in case there is a police car 36 (see FIG. 1) passing around the vehicle 22, the policemen can soon seize the thief without having to go far in the earliest time.

The processor 221 can alternatively drives the mobile telephone 203 to wirelessly send the aforesaid message of "I am a stolen vehicle, please call the police!" with the current position data $(X_0, Y_0, Z_0)$ to the police organization or the control center 414 by means of a short message.

The aforesaid vehicle-identification [VID] can be alternatively the engine number, blue-tooth module serial number, name of the vehicle owner, ID number of the vehicle owner, telephone number of the vehicle owner, credit card number of the vehicle owner, or any identification data that identifies the vehicle 22.

With reference to FIG. 4 again, the searching information M6 contains an advertising attribute [AR]=search2, which is a request given over to the control center 414 from a customer to search his (her) own stolen vehicle or his (her) companions' vehicles when accompanied traveling. As illustrated in FIG. 4, the searching information M6 includes a search listing containing various license plate numbers of vehicles to be searched in [VID] field.

The control center 414 disseminates the searching information M6 in advance to all vehicle repair shops 411 or blue-tooth stations 412 through PSTN, enabling the blue-tooth devices (not shown) of the vehicle repair shops 411 or the blue-tooth stations 412 to wirelessly send the searching information M6 to vehicle 1, which vehicle 1 in turn wirelessly sends the information M6 through its blue-tooth module 12 to the blue-tooth module 222 of the vehicle 22.

At this time, the processor 221 compares the series number SN=2002100800173 of this searching information M6 to be newer than the series number SN=2002100800172 of the previous information M5 stored in the memory device 223. Thus, the processor 221 stores the searching information M6 in the memory device 223 to replace the previous information M5, and drives the blue-tooth module 222 to disseminate the information M6 wirelessly.

The processor 221 also compares the vehicle-identification [VID]=2A5995 (i.e. license plate number) of the vehicle 22 stored in the memory device 223 as shown in FIG. 5 to be in conformity with one of the license plate numbers in [VID] field of the searching listing of the searching information M6. Thus, the processor 221 actively flashes the parking lamp subject to the content of operations-when-searched [Search_2] stored in the memory device 223 as shown in FIG. 5, and then drives the blue-tooth module 222 to disseminate the message of "I am 2A5995, and I am here $(X_1, Y_1, Z_1)$!" wirelessly. The data $(X_1, Y_1, Z_1)$ is the current position coordinates of the vehicle 22 obtained from the GPS module 204. The aforesaid message can be directly sent to the customer by a short message, or indirectly transferred to the customer through the help of control center 414.

The memory device 223 has further stored therein conditions-of-terminating-operation [TO] to terminate the operation of the corresponding electronic vehicle apparatus. For example, when the stolen vehicle 22 searched, the processor 221 terminates the operation of the burglar-alarm and the high position braking lamp or stops from sending the short message one hour latter or after having moved out of the territory of New York city, subject to the content of conditions-of-terminating-operation [TO_1] stored in memory shown in FIG. 5. Further, when the vehicle 22 found, the processor 221 terminates the flashing of the parking lamp ten minutes latter or after the distance between the two vehicles surpassed 500 meters, subject to the content of conditions-of-terminating-operation [TO_2] stored in memory shown in FIG. 5. A timer 206 may be alternatively added to the vehicle 22 to automatically terminate the operation of the burglar-alarm or parking lamp suibject to a predetermined time interval.

The aforesaid conditions-of-terminating-operation [TO-1] and [TO-2] are stored in the memory device 223 of the vehicle 22, or transmitted together with the aforesaid searching information M5, M6 to the blue-tooth module 222 of the vehicle 22 wirelessly, or transmitted to the mobile telephone 203 through the remote control center 414, police car or police station by means of a short message.

The conditions-of-terminating-operation [TO] can be comprised of one of the following parameters or their combinations: time/date, time interval, specific location, geographic zone, predetermined distance radius, and other parameters self-defined by the vehicle driver.

Rescuing Information

With reference to FIG. 4, the rescuing information M7 contains an advertising attribute [AR]=rescue1, which is a rescuing message sent by the vehicle 1. The rescuing-message [RM_1]="I am abducted, please call the police!" is stored in the memory device 13 of the vehicle 1 as shown in FIG. 6.

Therefore, when the vehicle 1 been hijacked, the driver of vehicle 1 can press an emergency button to activate the blue-tooth module 12 to transmit the above rescuing information M7 including rescuing-message [RM_1], the current position data ($X_2$, $Y_2$, $Z_2$) obtained from the GPS module 14, and an emergency series number %RS(010017)7K6543 representing a No. 10017 message created by the vehicle-identification [VID]=7K6543 of vehicle 1.

When a nearby vehicle 22 received the rescuing information M7, the processor 221 of the vehicle 22 immediately compares the series number RS=(010017)7K6543 of the received information M7 to be a newer one than any of series number having the heading of %RS in the previous information stored in the memory device 223. Thus, the processor 221 controls the blue-tooth module 222 to disseminate the currently received rescuing information M7, and at the same time duplicates one copy in the memory device 223 as shown in FIG. 5 and drives the audio device 227 to repeatedly play the content of the above rescuing-message [RM_1]="I am abducted, please call the police!" Upon acquainted with the message, the driver of the surrounding vehicles 22 can go to make a rescue, or to call the police personally, or to use the blue-tooth module 222 or the mobile telephone 203 on vehicle 22 to call the police.

The other rescuing information M8 shown in FIG. 4 comprises a rescuing attribute [AR]=rescue2, which is a message of out of gasoline sent actively by the vehicle 1. The rescuing procedure is similar with the last example of rescuing information M7. The blue-tooth device 19 of the vehicle 1 can actively disseminate any other rescuing message such as out of water, explosion of tire, vehicle failure, or the like to other vehicles passing by for earliest rescue.

The memory device 13 or 223 further has stored therein the conditions-of-terminating-dissemination [TD] to terminate the blue-tooth module 12 or 222 from sending out the rescuing information M7 or M8 wirelessly. For example, the processor 11 or 221 can terminate the transmission of the rescuing information M7 three days after the beginning of the transmission of the rescuing information M7 subject to the conditions-of-terminating-dissemination [TD_1] shown in FIG. 6 or 5. With respect to the message of out of gasoline of rescuing information M8, the processor 11 or 221 can disseminate the information M8 only within the radius of 500 meters subject to the conditions-of-terminating-dissemination [TD_2] shown in FIG. 6 or 5. If the vehicle 1 or 22 has a timer 15 or 206 therein, the blue-tooth module 12 or 222 can be set to terminate dissemination after a predetermined length of time.

The aforesaid conditions-of-terminating-dissemination [TD] can be stored in the memory device 13 of the vehicle 1 in advance, or alternatively included in the disseminating information M7 or M8 for dissemination via the blue-tooth module 12. Alternatively, the remote control center 414, the police car or police station can send a short message including a terminating instruction with the above terminating condition [TD] therein to the mobile telephone 16 of the vehicle 1.

The conditions-of-terminating-dissemination [TD] can be comprised of one of the following parameters or their combination: time/date, time interval, specific location, geographic zone, predetermined distance radius, and other parameters self-defined by the vehicle driver.

Socializing Information

With reference to FIG. 4, the socializing information M9 contains a socializing attribute [AR]=match, which is a message of making friend sent out actively by the vehicle 1. As shown in FIG. 6, the memory device 13 of the vehicle 1 has stored therein the matching-limitations [ML] pre-defined by the owner of the vehicle 1. FIG. 5 shows the memory device 223 of the other vehicle 22 has stored therein the basic-data-of-vehicle-owner [Basic] of the vehicle 22.

Therefore, when the blue-tooth module 12 of the vehicle 1 actively disseminated the socializing information M9 containing the matching-limitations [ML], it can be received by the blue-tooth module 222 of another vehicle 22 or any other vehicles everywhere. The blue-tooth module 222 of the vehicle 22 can then disseminate the socializing information M9 again (alternatively, it can be set not to disseminate the information M9 anymore). The processor 221 of the vehicle 22 can also compares the hobby "pop song" in basic-data-of-vehicle-owner [Basic] as shown in FIG. 5 to be in conformity with that of matching-limitation [ML] of the socializing information M9 shown in FIG. 4. At this time, the processor 221 informs the vehicle owner by audio or video image, urging him (her) to drive to the location ($X_4$, $Y_4$, $Z_4$) of the vehicle 1 and to make friend, or to use the blue-tooth module 222 or the mobile telephone 203 to contact the vehicle owner of the vehicle 1 for social functions.

Although the present invention has been explained in relation to its preferred embodiments, it is to be understood that many other possible modifications and variations can be made without departing from the spirit and scope of the invention as hereinafter claimed.

What is claimed is:

1. An on-vehicle wireless communication apparatus carried on a vehicle, comprising:

a specific wireless communication module adapted to actively log in a plurality of specific wireless communication modules of other vehicles by means of a common authorization key so as to make a wireless connection for transmitting voice and/or data information mutually, to passively accept log-in requests from the specific wireless communication modules of said other vehicles by means of said common authorization key so as to make a wireless connection for transmitting voice and/or data information mutually, and to passively receive a disseminating information from an external wireless communication module wirelessly;

a processor adapted to control said specific wireless communication module to wirelessly transmit said disseminating information to the specific wireless communication modules of said other vehicles wirelessly connected; and a memory device, wherein said disseminating information is comprised of a series number and disseminating content; and said memory device has stored therein the series number and disseminating content of a previously received disseminating information, and wherein said processor controls the specific wireless communication module of said vehicle to wirelessly transmit the series number and disseminating content of the previously received disseminating information stored in the memory device of said vehicle to the specific wireless communication modules of said other connected vehicles when the series number of a currently received disseminating information is compared with and found to be older than the series number of the previously received disseminating information.

2. The on-vehicle wireless communication apparatus as claimed in claim 1, wherein said specific wireless communication module of said vehicle is a blue-tooth module having a communication radius reaching to a predetermined distance outside said vehicle.

3. The on-vehicle wireless communication apparatus as claimed in claim 1, wherein said external wireless communication module is a blue-tooth module.

4. The on-vehicle wireless communication apparatus as claimed in claim 1, wherein said processor further controls at least one electronic vehicle component of said vehicle to operate subject to the disseminating content of a currently received disseminating information when the series number of the currently received disseminating information is compared with and found to be newer than the series number of the previously received disseminating information.

5. The on-vehicle wireless communication apparatus as claimed in claim 1, wherein said disseminating information is an update information, and said disseminating content is an update content corresponding to at least one electronic vehicle component of said vehicle, so that said processor can update the computer software and/or data used by the at least one electronic vehicle component of said vehicle subject to said update content.

6. The on-vehicle wireless communication apparatus as claimed in claim 5, wherein said memory device has further stored therein the type of said vehicle, and the update content further contains a type of vehicle to be updated, so that said processor runs data updating only when the type of vehicle of the update content is compared and found to be in conformity with the type of said vehicle stored in said memory device.

7. The on-vehicle wireless communication apparatus as claimed in claim 1, wherein said disseminating information is an advertising/promoting information, and said disseminating content is an advertising/promoting content, so that said processor can control an audio and/or video device of said vehicle to play said advertising/promoting content.

8. The on-vehicle wireless communication apparatus as claimed in claim 7, wherein said memory device has further stored therein a condition to accept advertising/promoting, and said advertising/promoting content further contains an advertising/promoting classification, so that said processor enables said advertising/promoting content to be played only when the classification of said advertising/promoting content is compared and found to be in conformity with said condition to accept advertising/promoting stored in said memory device.

9. The on-vehicle wireless communication apparatus as claimed in claim 1, wherein said memory device has further stored therein an identification code of said vehicle, said disseminating information is a searching information, and said disseminating content is a searching content comprising a search listing containing at least one identification code of said vehicle to be searched, so that said processor drives at least one electronic vehicle component of said vehicle to operate when identification code of said vehicle stored in said memory device is compared and found to be in conformity with one of the identification codes of vehicles listed in said search listing.

10. The on-vehicle wireless communication apparatus as claimed in claim 9, wherein said search listing is a stolen vehicle listing.

11. The on-vehicle wireless communication apparatus as claimed in claim 9, wherein said search listing is a listing of an identification code of a searching vehicle requested by a customer.

12. The on-vehicle wireless communication apparatus as claimed in claim 9, wherein said identification code of the vehicle is a license plate number of the vehicle.

13. The on-vehicle wireless communication apparatus as claimed in claim 9, wherein said at least one electronic vehicle component includes a burglar-alarm.

14. The on-vehicle wireless communication apparatus as claimed in claim 9, wherein said memory device has further stored therein a condition for setting the termination of operation of at least one electronic vehicle component of said vehicle.

15. The on-vehicle wireless communication apparatus as claimed in claim 1, wherein said memory device has further stored therein a condition for setting the termination of operation of at least one electronic vehicle component of said vehicle.

16. The on-vehicle wireless communication apparatus as claimed in claim 1, wherein said vehicle further carries a mobile telephone adapted to wirelessly receive an external instruction for terminating the operation of at least one electronic vehicle component of said vehicle.

17. The on-vehicle wireless communication apparatus as claimed in claim 1, wherein said memory device has further stored therein a condition for setting the specific wireless communication module of said vehicle to terminate the transmitting of said disseminating information.

18. The on-vehicle wireless communication apparatus as claimed in claim 1, wherein said disseminating information includes a condition for setting the specific wireless communication module of said vehicle to terminate the transmitting of said disseminating information.

19. The on-vehicle wireless communication apparatus as claimed in claim 1, wherein said vehicle further carries a mobile telephone adapted to wirelessly receive an external instruction for terminating the specific wireless communication module of said vehicle from transmitting said disseminating information.

20. The on-vehicle wireless communication apparatus as claimed in claim 1, wherein said vehicle further carries a GPS (global positioning system) module adapted to compute the current position data of said vehicle; and said processor further controls the specific wireless communication module of said vehicle to wirelessly transmit the current position data of said vehicle when disseminating said disseminating information.

21. The on-vehicle wireless communication apparatus as claimed in claim 1, wherein said external wireless communication module of said other vehicles is a bluetooth module.

22. An on-vehicle wireless communication apparatus carried on a vehicle, comprising:
- a specific wireless communication module adapted to actively log in a plurality of specific wireless communication modules of other vehicles by means of a common authorization key so as to make a wireless connection for transmitting voice and/or data information mutually, and to passively accept log-in requests from the specific wireless communication modules of said other vehicles by means of said common authorization key so as to make a wireless connection for transmitting voice and/or data information mutually;
- a processor adapted to control said specific wireless communication module to wirelessly transmit said disseminating information to the specific wireless communication modules of said other vehicles wirelessly connected:
- a memory device, said memory device having stored therein a disseminating content; and
- a processor adapted to control the specific wireless communication module of said vehicle to wirelessly transmit a disseminating information containing said disseminating content to the specific wireless communication modules of said other vehicles wirelessly connected,
- wherein said disseminating information is a socializing information, and said disseminating content contains a matching limitation; said other vehicles each having a matching limitation thereof, so that said other vehicles actively make a socializing contact with said vehicle when the matching limitation of the respective other vehicle is compared and matched to the matching limitation of said vehicle after receipt of said socializing information.

23. The on-vehicle wireless communication apparatus as claimed in claim 22, wherein said specific wireless communication module of said vehicle is a blue-tooth module having a communication radius reaching to a predetermined distance outside said vehicle.

24. The on-vehicle wireless communication apparatus as claimed in claim 22, wherein said disseminating information is a rescuing information, and said disseminating content contains an identification code of said vehicle and a rescuing message, so that said other vehicles actively come to rescue when said rescue message is received.

25. The on-vehicle wireless communication apparatus as claimed in claim 24, wherein said identification code of said vehicle is a license plate number of the vehicle.

26. The on-vehicle wireless communication apparatus as claimed in claim 24, wherein said rescuing message is a hijack message.

27. The on-vehicle wireless communication apparatus as claimed in claim 24, wherein said rescuing message is a message of out of gasoline.

28. The on-vehicle wireless communication apparatus as claimed in claim 22, wherein said memory device has further stored therein a condition for setting the specific wireless communication module of said vehicle to terminate the transmitting of said disseminating information.

29. The on-vehicle wireless communication apparatus as claimed in claim 22, wherein said vehicle further carries a mobile telephone adapted to wirelessly receive an external instruction for terminating the specific wireless communication module of said vehicle from transmitting said disseminating information.

30. The on-vehicle wireless communication apparatus as claimed in claim 22, wherein said vehicle further carries a GPS (global positioning system) module adapted to compute the current position data of said vehicle; and said disseminating content of said disseminating information further contains said current position of said vehicle.

* * * * *